Figure 1:
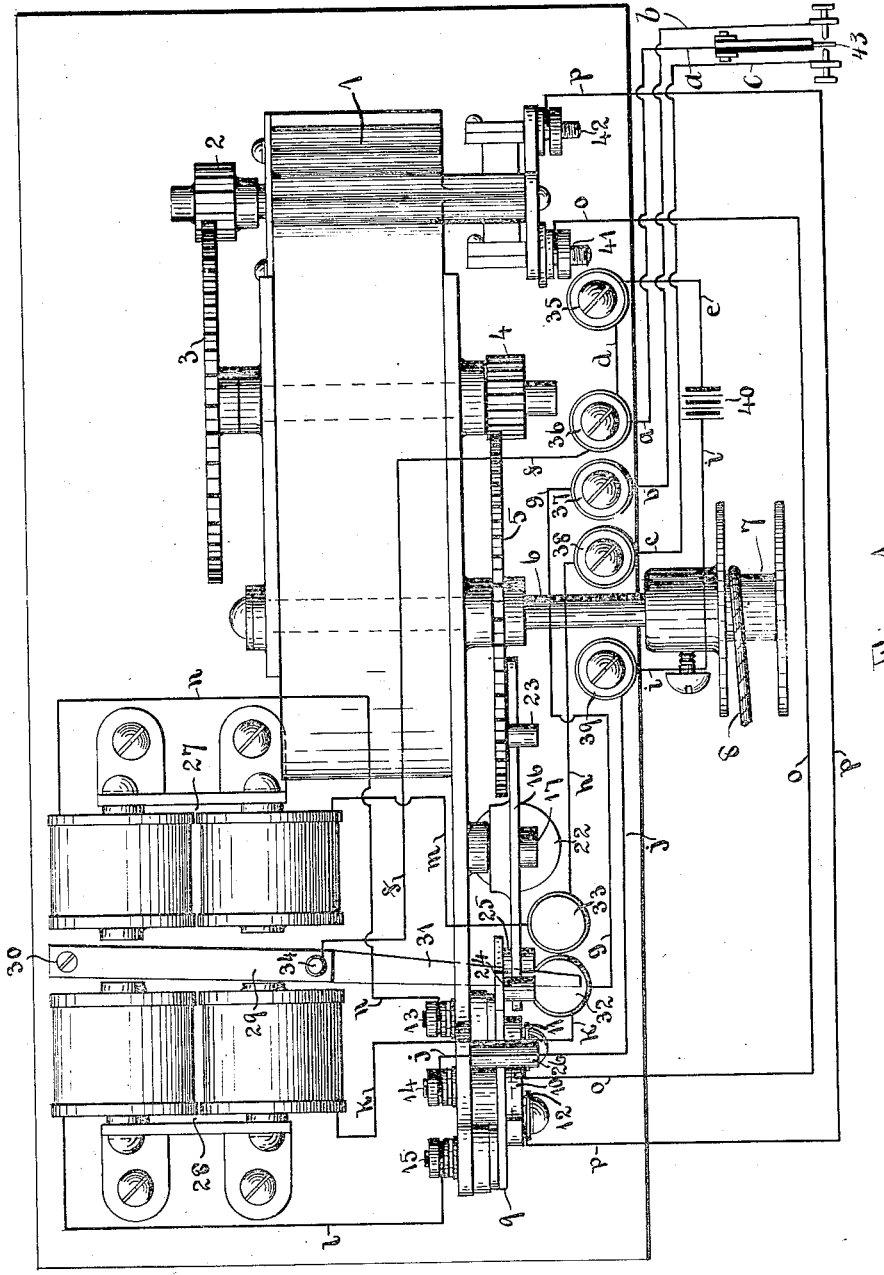

R. L. GUION & B. C. JOHNSON.
AUTOMATIC CONTROLLING SWITCH FOR ELECTRIC MOTORS.
APPLICATION FILED NOV. 9, 1908.

953,006.

Patented Mar. 22, 1910.
2 SHEETS—SHEET 1.

WITNESSES:

INVENTORS
Richard L. Guion
Burchard C. Johnson
Eugene Niven
ATTORNEY

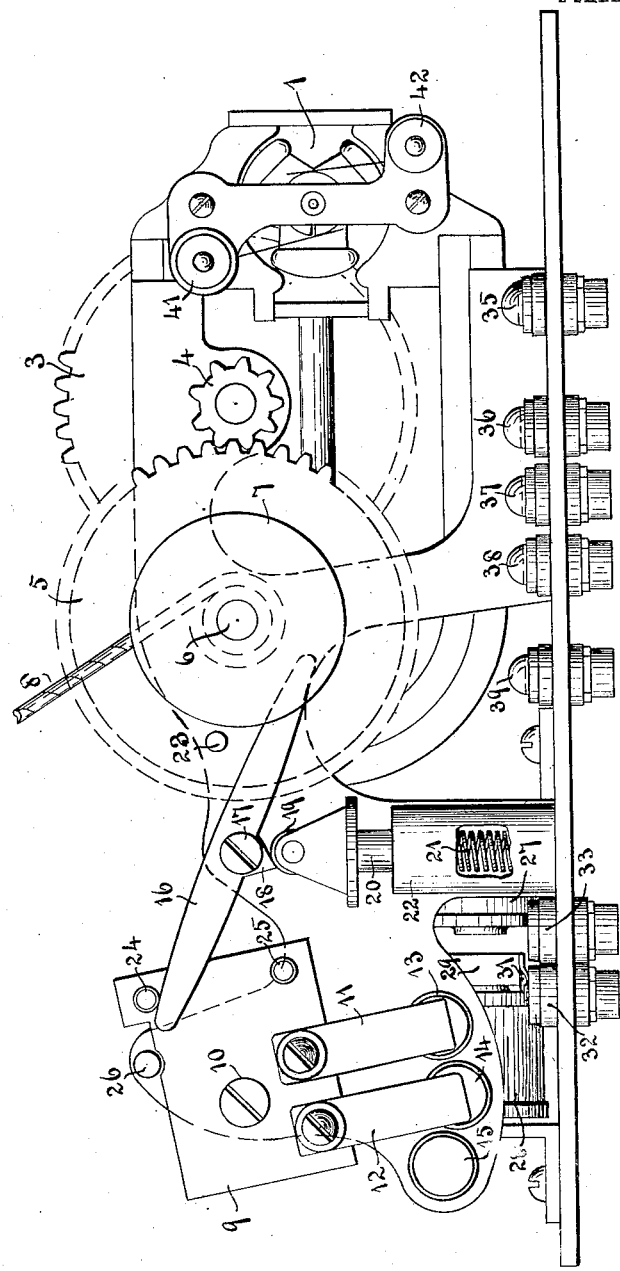

UNITED STATES PATENT OFFICE.

RICHARD L. GUION AND BURCHARD C. JOHNSON, OF ELMIRA, NEW YORK, ASSIGNORS TO AMERICAN THERMOSTAT COMPANY, OF ELMIRA, NEW YORK.

AUTOMATIC CONTROLLING-SWITCH FOR ELECTRIC MOTORS.

953,006.  Specification of Letters Patent.  Patented Mar. 22, 1910.

Application filed November 9, 1908. Serial No. 461,599.

*To all whom it may concern:*

Be it known that we, RICHARD L. GUION and BURCHARD C. JOHNSON, citizens of the United States, residing at Elmira, in the county of Chemung and State of New York, have invented certain new and useful Improvements in Automatic Controlling-Switches for Electric Motors, of which the following is a specification.

This invention relates to improvements in switches employed for controlling the movements of electric motors, where the motors are required to run for a given number of revolutions in both directions, and to be set in motion by a circuit closing device located at a distance from the motor; as in thermostatic damper regulating apparatus, automatic clock winders, etc.

The objects of our invention are: first, to provide an improved switch for opening and reversing the motor circuit after the motor has completed the prescribed number of revolutions in either direction; and, second, to provide an auxiliary switch whereby the connections leading to the circuit closing device will be short circuited immediately upon the closing of the motor circuit; thereby eliminating the effect of any fluctuation in the circuit closer and insuring the running of the motor for the prescribed number of revolutions.

In thermostatic damper regulators particularly, it frequently occurs that the thermostat is affected by sudden changes in temperature, as caused by the opening of a door or window, while the motor is running. This causes the circuit to be broken before the motor has completed its work; thus leaving the dampers partially set and permitting the temperature to continue to fall or rise without control until the apparatus has been manually reset in operative condition.

The particular object, therefore, of our invention has been to overcome this difficulty, as well as to provide an improvement in the switching device for controlling the movements of the motor. This latter device may be employed with or without the auxiliary switch, where the motor is to be used for other than thermostatic regulating purposes. We do not, therefore, wish to be understood as confining ourselves to the employment of these switches in combination with one another or in connection with any particular motor-driven apparatus.

For the purpose of setting forth the invention in all its details, we will describe it herein as applied to a thermostat regulating apparatus.

In carrying out our objects, as above specified, we arrange the switches and apply them to the motor in the manner illustrated in the accompanying drawings, in which—

Figure 1 represents a plan view of a motor arranged to drive the drum to which a regulating chain or cable is attached, with our automatic switches applied thereto, and the wiring connections for the motor and switches indicated, as required to carry out the invention; and Fig. 2, a side elevation thereof.

Like characters designate like parts in the two views, the several wiring connections being designated by letters in Fig. 1.

As the apparatus is shown for damper regulating purposes, it consists of a motor 1, of any usual form adapted for this purpose, with its shaft geared by suitable reducing gears 2, 3, 4, and 5, to a shaft 6, which carries the drum 7, to which the cable 8, or a chain, is attached, said cable being suitably connected to the damper or dampers which are to be opened and closed by the operation of the motor. This part of the apparatus may be of any approved form.

In carrying out our invention we provide a switchblock 9, pivoted at 10 upon an extension of one of the motor side frames. This switchblock, at 11 and 12, is provided with two insulated switcharms, the free ends of which are adapted to engage and slide over the contacts 13, 14, and 15, mounted upon the frame extension. A rock arm 16 is pivoted at 17 to the side frame between the gear 5 on the drum shaft and the switchblock 9. This rock arm is provided with a V-shaped projection 18 below its pivot point, which is engaged by roller 19 mounted upon the upper end of the plunger 20, which rests upon a spring 21 contained in a guide box 22, supported on the base of the apparatus. The gear 5 is provided with a pin 23, adapted to engage and throw the rock arm 16 in one direction or the other, whenever the gear wheel has completed one revolution in one direction or the other. On the switchblock 9 are two pins 24 and 25, so positioned as to be struck by the rock arm, whenever the projection 18 has been thrown to one side or the other of the roller 19 by pin 23, to throw the switcharms 11 and 12 across the contacts 13, 14, and 15. The action of the spring pressed plunger 20 upon the rock arm 16 is to throw the rock arm quickly after the pin 23 has carried the point of the projection 18 past the line of centers in one direction or the other, so that the rock arm will strike the pins 24 and 25 and snap the switcharms across the terminals, thereby preventing arcing. The throw of the switchblock 9 in one direction or the other is limited by the stop pin 26, fastened to the side frame above the block. This constitutes the stop and reversing switch for the motor, and its operation will presently appear. At one side of this stop and reversing switch, is an auxiliary short circuiting switch comprising two magnets 27 and 28, fastened opposite one another upon the bed-plate of the apparatus, and having an armature 29 pivoted between them on a pivot pin 30. From the free end of this armature a switcharm 31 projects, with its outer end adapted to engage one or the other of the contacts 32 and 33, as the armature is swung from one to the other of the magnets. The armature 29 is provided with a binding post at 34, and the base-plate is provided with a series of binding posts 35, 36, 37, 38, and 39.

The wiring of the apparatus is arranged as follows: The three wires $a$, $b$, and $c$, are brought to the apparatus from the thermostat, and fastened to the binding posts 36, 37, and 38. From the binding post 36 a wire $d$ runs to the binding post 35, to which wire $e$ from one pole of a battery 40 is fastened. From the binding post 36 a wire $f$ runs to the binding post 34 on the armature 29. From the binding post 37 a wire $g$ runs to a binding post on contact 32; and contact 33 is connected by wire $h$ to binding post 38. The other pole of the battery 40 is connected by a wire $i$ with binding post 39, from which a wire $j$ runs to a binding post at the back of the contact 14. From contact 32 a wire $k$ runs to the coils of magnet 28, the other end of said coils being connected by wire $l$ with a binding post at the back of contact 15. From contact 33 a wire $m$ runs to the coils of magnet 27, the other end of which coils are connected by wire $n$ with a binding post at the back of contact 13. The switcharms 11 and 12 are connected with binding posts 41 and 42 on the motor brush supports by the wires $o$ and $p$, respectively.

The operation of the switches and the motor as so arranged is as follows: As shown, in the two figures, the parts are set in position to start the motor in the direction for winding the cable upon the drum. If, now, the circuit through wires $a$ and $c$ is closed by the thermostat 43, by reason of a fall in temperature, the current from the battery will run through wires $e$, $d$, $a$, $c$, $h$, $m$, $n$, contact 13, switcharm 11, wire $o$, through the motor, thence by wire $p$, switcharm 12, contact 14, and wires $j$ and $i$ back to the battery. The current in passing through the coils of the magnet 27 causes the armature 29 to be thrown over to the right, thereby placing switcharm 31 in engagement with contact 33. This acts to short circuit the connections running to the thermostat, the current from the battery now taking the shorter course through wires $e$, $d$, $f$, arm 31, to contact 33, and thence through wires $m$, $n$, etc., as before. This short circuits the thermostat connection and prevents, or greatly reduces, sparking at the thermostat points. It will thus be seen that the motor will continue to run even should the circuit through wires $a$ and $c$ be opened by the separation of the thermostat terminals from any cause; and that the motor will continue to run until gear wheel 5 has made a complete revolution. As the wheel approaches the completion of its revolution, the pin 23 will contact with rock arm 16, lifting said arm until projection V is carried past the center of roller 19. The upward pressure on the roller will then throw the rock arm away from pin 23 on the one side, and into contact with pin 25 on the other, thereby snapping switchblock 9 over into reversing position with switcharms 11 and 12 in engagement with contacts 13 and 14 respectively. This opens the circuit by cutting out contact 13 and its connecting wires, and stops the motor. If, now, the temperature rises to the point for which the thermostat is set to close the dampers, the circuit will be closed between wires $a$ and $b$, and the current will be established from the battery through wires $e$, $d$, $a$, $b$, $g$, $k$, magnet 28, wire $l$, contact 15, switcharm 12, wire $p$, through the motor in reverse direction, thence by wire $o$, arm 11, contact 14, and wires $j$ and $i$, back to the battery; thus starting the motor in reverse direction and at the same time energizing magnet 28 to draw the armature 29 back into the position shown in Fig. 1; thereby again short circuiting the thermostat connections, and causing the current to flow from the batteries through wires $e$, $d$, $f$, switcharm 31, to contact 32 and thence through wires $k$, $l$, etc., as before, keeping the motor in motion until the pin 23 on gear 5 passes around and strikes the rock arm 16 on its upper side; when the rock arm will be thrown again into the position shown in Fig. 2, and the apparatus will be set in position to operate the dampers, when the thermostat is next affected by a fall in temperature to the point at which it is set to act.

In some forms of apparatus operated by a motor in this manner it will not be required to employ the short circuiting switch, and we, therefore, do not limit ourselves to the combination of this switch with the motor stopping and reversing switch. Moreover, the latter switch may be applied wherever it may be desired to limit the rotations of a motor to a certain prescribed number of revolutions whether it is to be reversed by the current or not.

What we claim, and desire to secure by Letters Patent is—

1. The combination, with an electric motor having a reversible circuit controlled by a circuit closing device, of a switch in the circuit adapted to be actuated when the motor has completed a given number of revolutions in either direction to shift the circuit for the reversal of the motor, and means actuated by the closing of the circuit in either direction for short circuiting the respective connections leading to the circuit closing device.

2. The combination, with an electric motor having a circuit controlled by a circuit closing device, of a switch in the circuit adapted to be actuated when the motor has completed a given number of revolutions to open the circuit and stop the motor, a second switch adapted to short circuit the connections leading to the circuit closing device, and an electro-magnet included in the circuit for operating said second switch, said magnet being actuated upon the closing of the circuit to shift the switch into short circuiting position.

3. The combination, with an electric motor having reversing circuits controlled by a circuit closing device, of a switch in the circuit adapted to be actuated when the motor has completed a given number of revolutions in either direction to reverse the circuit, a second switch adapted to short circuit either set of connections leading to the circuit closing device, and an electro-magnet included in each circuit for operating said second switch, one or the other of said magnets being actuated upon the closing of the circuit within which it is included to shift the switch into its corresponding short circuiting position.

4. The combination, with an electric motor, of a switch in the motor circuit comprising a pivotal switch-block provided with one or more switch-arms, a contact or contacts in position to be engaged by said arm or arms, a rock-arm pivoted at one side of the switch-block, projections on said block adapted to be struck by said arm when thrown in either direction, and means on a rotating member driven by the motor for moving said arm when said member has completed a revolution in either direction.

5. The combination, with an electric motor, of a switch in the motor circuit comprising a pivotal switch-block provided with one or more switch-arms, a contact or contacts in position to be engaged by said arm or arms, a rock-arm pivoted at one side of the switch-block, projections on said block adapted to be struck by said arm when thrown in either direction, a V-shaped projection on the rock-arm at one side of its pivot point, a spring actuated plunger having engagement with said projection, and means on a rotating member driven by the motor for moving said arm past centers in either direction when said member has completed a revolution in one direction or the other.

In testimony whereof we have affixed our signatures in presence of two witnesses.

RICHARD L. GUION.
BURCHARD C. JOHNSON.

Witnesses:
M. E. VERBECK,
A. S. DINEN.